INVENTORS:
J.H. McSHERRY
L.E. SMITH

INVENTORS:
J. H. McSHERRY
L. E. SMITH

Oct. 23, 1962  J. H. McSHERRY ETAL  3,059,425
THRUST CONTROL SYSTEM FOR ROCKET ENGINES
Filed Nov. 9, 1959  5 Sheets-Sheet 4

INVENTORS:
J.H. McSHERRY
L.E. SMITH
BY
ATTORNEYS

Oct. 23, 1962   J. H. McSHERRY ETAL   3,059,425
THRUST CONTROL SYSTEM FOR ROCKET ENGINES
Filed Nov. 9, 1959   5 Sheets-Sheet 5

INVENTORS:
J.H. McSHERRY
L.E. SMITH
BY
ATTORNEYS

United States Patent Office 3,059,425
Patented Oct. 23, 1962

3,059,425
THRUST CONTROL SYSTEM FOR ROCKET ENGINES
James H. McSherry, Energy, and Lester E. Smith, Herrin, Ill., assignors to Olin Mathieson Chemical Corporation, East Alton, Ill., a corporation of Virginia
Filed Nov. 9, 1959, Ser. No. 851,913
4 Claims. (Cl. 60—35.6)

This invention relates to rocket engines and particularly to solid propellent rocket engines provided with means to change and control their thrust.

The functioning and thrust level of liquid fueled rocket engines can be readily controlled by modifying the amount of fuel introduced into the combustion chamber. In a solid fuel rocket engine, however, such as may be used in rockets, guided missiles or rocket sleds, and containing the entire supply of fuel in the combustion chamber, it is impractical to vary the burning rate of the fuel and the resultant thrust of the motor by increasing or decreasing the quantity of the burning fuel. Generally, the burning rate of a solid fuel is directly proportional to the pressure in the combustion chamber and inversely proportional to the area of the nozzle throat. Thus, solid propellant engines are presently designed for use at a single thrust level. Such devices are quite limited in their application and are not satisfactory in guided missiles and test rocket sleds in which the thrust must be controlled within narrow limits and must be changed to different levels instantaneously to insure proper ballistic results. While various methods have been provided for controlling and varying the thrust level of a solid propellent rocket engine, they are not completely satisfactory. Their main deficiency resides in the fact that they are rigidly designed and any alteration in the cross-sectional area of the nozzle or in the characteristics of the propellent will result in unpredictable ballistic behavior. Thus, in accordance with previous techniques, the thrust level cannot be adjusted or controlled when nozzle erosion or propellent disintegration occurs.

It is, therefore, an object of this invention to provide a rocket motor having thrust control means overcoming the disadvantages of the prior art. It is also an object of this invention to electrically control and vary the rate of change of thrust of a solid fuel rocket engine by electro-mechanical monitoring devices. Another object of this invention is to provide means to reliably vary and control the thrust of a solid fuel rocket engine. A further object of this invention is to provide a novel electro-mechanical control system for the thrust of a solid propellent rocket engine. A more specific object of this invention is to vary and control the thrust level of a solid propellent rocket engine by electrical means monitored with an electrical transducer responsive to the combustion chamber pressure.

These and other objects are accomplished in accordance with this invention by providing a solid propellent rocket engine with an exhaust nozzle having a fixed effective area and a flow restrictor or bob controllably and telescopically positioned within the nozzle orifice to modify the effective area of the opening and thus the thrust of the rocket engine. The position of the flow restrictor is regulated by a hydraulic system whose operation is predetermined by an electrical programming device. In addition, the electrical programming circuitry is monitored by impulses from a pressure actuated transducer exposed to the pressure generated within the combustion chamber. Any deviation from the predetermined programmed operation is sensed by the transducer and impulses from the transducer are then utilized to rapidly and efficiently correct such unscheduled deviations. In this manner, the present invention minimizes the possibility of malfunction of solid propellent rocket motors due to uncontrollable changes in thrust level.

The present invention and the manner in which it accomplishes its objects will be readily apparent from the following detailed description and drawing in which.

Figure 1:
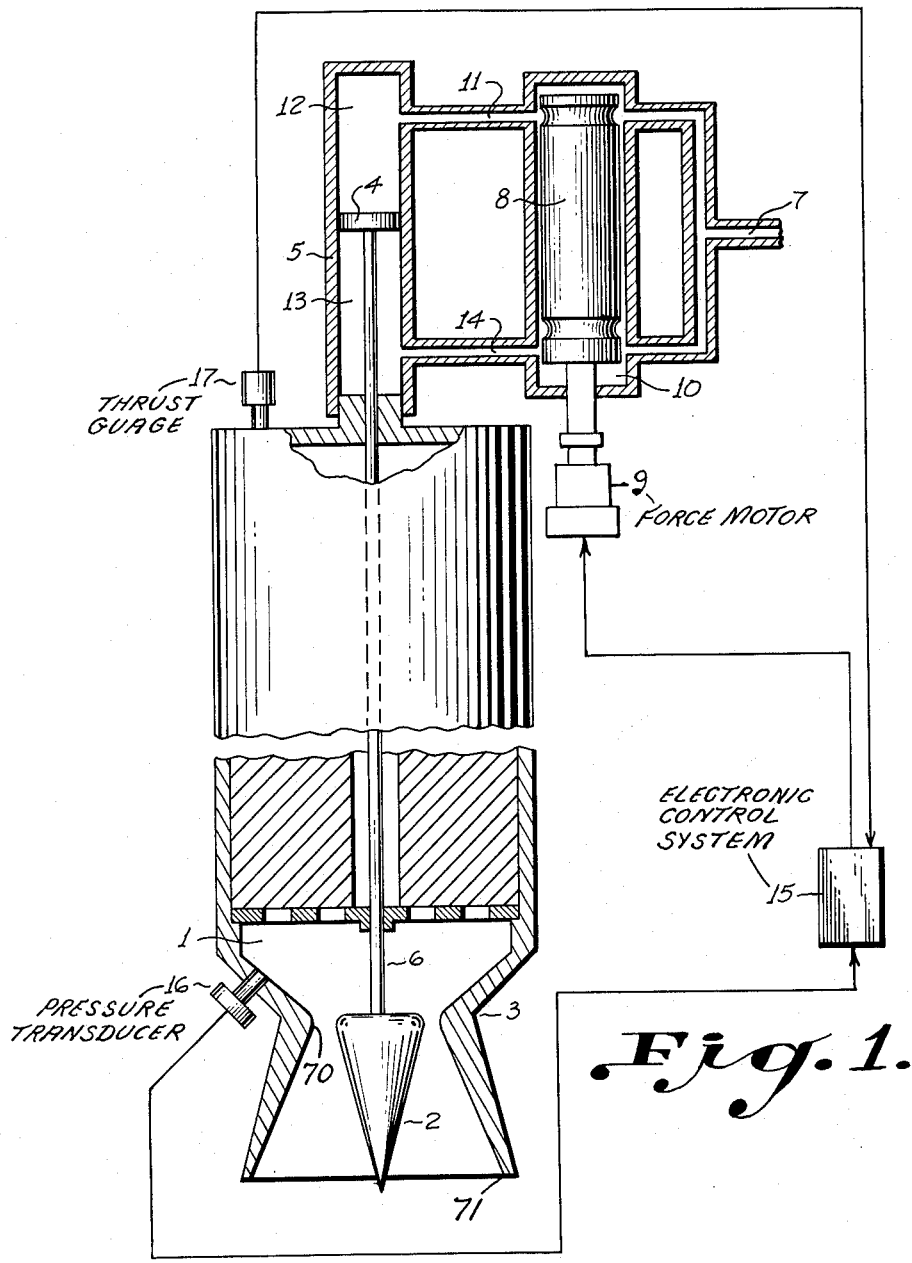
FIGURE 1 is a schematic partial sectional view of a rocket engine and control mechanism illustrating an embodiment of the present invention.

As illustrated in FIGURE 1, a rocket engine 1 is provided with a differential pressure actuated fluid flow restrictor 2. The restrictor is positioned within the rocket nozzle exhaust port or orifice 3 having a nozzle throat area 70 and a nozzle exit area 71. The throat area 70 is the smallest cross-sectional area in the nozzle 3. The exit area 71 is the cross-sectional area across the exit end of the nozzle 3. Restrictor 2 is linked with piston 4 contained in cylinder 5 by rod 6, which is caused to move back and forth in the nozzle orifice 3 as desired. This movement is effected by feeding hydraulic fluid to either side of the piston 4 in cylinder 5. The hydraulic fluid is fed through line 7 from a reservoir (not shown) through hydraulic valve spindle 8 which is driven by force motor 9. This motor is preferably contained within valve body 10 but in this schematic presentation is shown separately for clarification. The force motor 9 controls the piston of the valve spindle 8 which in turn determines whether fluid passes through line 11 into the forward portion 12 of cylinder 5 or into the rearward portion 13 of the cylinder 5 through line 14. In the position shown in FIGURE 1, the hydraulic fluid passes through line 11 into the forward portion 12 of cylinder 5 causing piston 4 and restrictor 2 to move rearwardly. Force motor 9 is actuated by an electronic control system 15 comprising a servo mechanism utilizing a predetermined program device integrally contained therein and a pressure transduer 16 or a thrust gauge 17 as a feed-back arrangement to monitor the engine reaction. These specific features of the embodiment will be described in more detail hereinafter.

The programming device will now be described with particular reference to FIGURE 4 of the drawing. As illustrated, this device consists of a drum 18, drive motor 19, and rate of thrust bank 20 provided with a series of contact pins 21. The surface of the drum 18 is divided into back-up block 22 to which is affixed a series of etched tapes 23 which is shown in more detail in FIGURE 5.

Etched tape 23 is copper clad fluorinated polyethylene etched to form the necessary number of continuous strips around the drum 18 on which the electrical contact pins 21 ride as the drum is rotated. Level of thrust bank 72 is provided with a second set of contact pins 24 which ride on adjacent channels of the drum where the copper has been removed except where the program requires it to remain. The first set of contact pins 21 are electrically separated from one another by a resistor of appropriate value. A voltage is impressed across the group of resistors in series forming a voltage divider network. As the drum is rotated, a time base is formed by the constant velocity of the drive motor 19, which is preferably a synchronous motor. The second set of contact pins 24 are electrically joined together. Etched tape 23 is etched in such a manner that the second set of contact pins 24 may be at any potential available to the first set of contact pins 21 by virtue of the tape bridging any pair. In this manner, the program device acts as a variable potentiometer.

Figure 2:
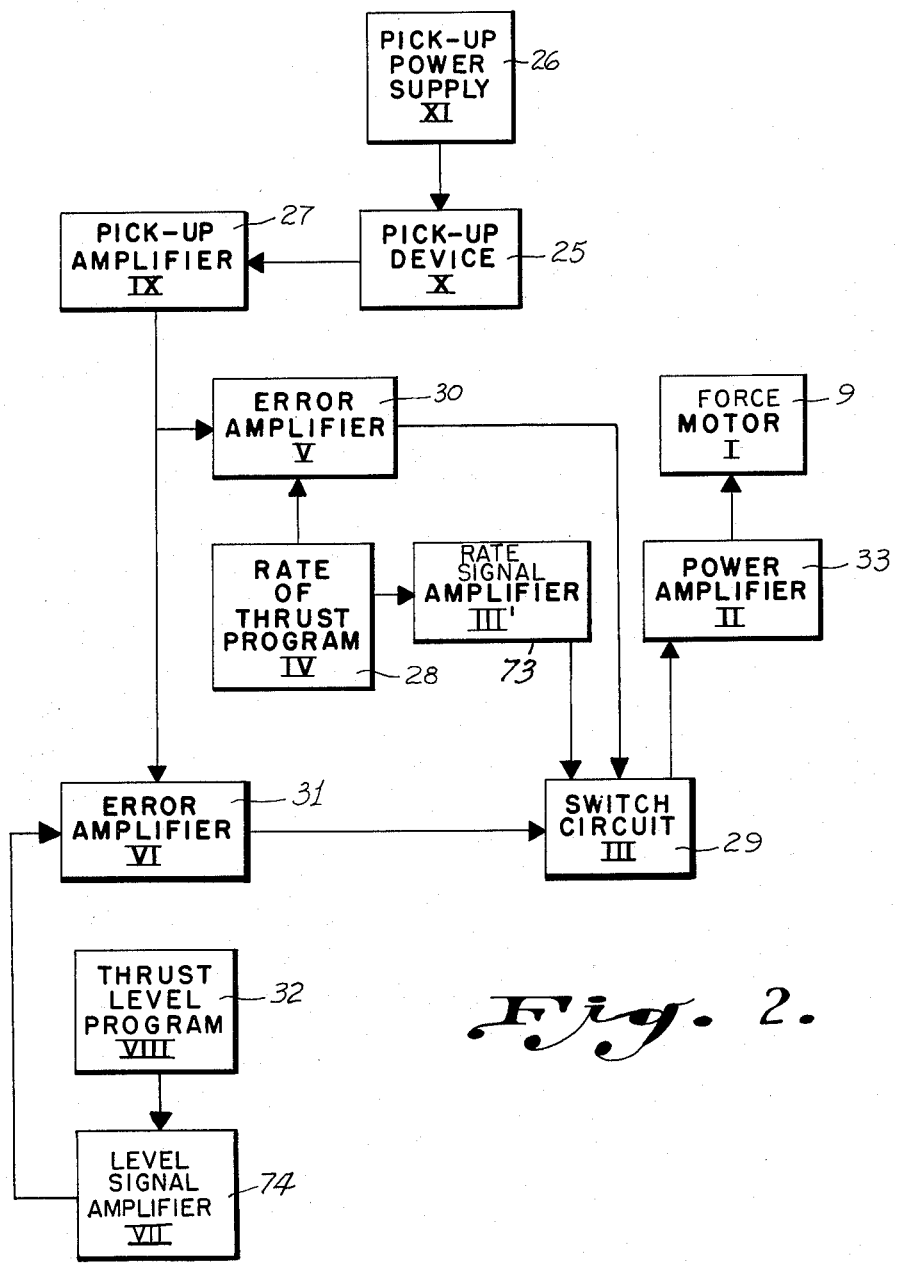
FIGURE 2 is a schematic flow diagram illustrating one type of electrical control system that can be utilized in accordance with the present invention.

The electrical circuitry will be described in connection with FIGURES 2 and 3 of the drawing. In these two figures, the various portions of the circuitry are keyed by corresponding Roman numerals. As shown in the schematic presentation of FIGURE 2, pick-up device 25 (X), which may be either pressure transducer 16 or thrust gauge 17, is provided with a pick-up power supply 26 (XI). The signal from pick-up device 25, which is a measure of the pressure within the rocket engine, is amplified by pick-up amplifier 27 (IX) and fed to an error amplifier 30 (V).

A predetermined rate of thrust program 28 (IV) transmits the program signal to a rate signal amplifier 73 (III'), and then to switch circuit 29 (III). Rate signal amplifier 73 (III') is shown in FIGURE 3 as a part of switch circuit III and will be discussed more fully below.

Rate of thrust program 28 also sends a signal to error amplifier 30 where the signal is compared with the signal from pick-up amplifier 27, and any differences in the signals are fed to switch circuit 29. The resultant signal from error amplifier 30 serves as a monitor in switch circuit 29 for the rate of thrust signal from rate signal amplifier 73 in switch circuit 29. Thrust level program 32 (VIII) transmits a signal to level signal amplifier 74 (VII), which transmits the amplified signal to error amplifier 31 (VI). The signal from pick-up amplifier 27, which is a measure of the pressure in the rocket engine, is also transmitted to error amplifier 31. The signals from level signal amplifier 74 and pick-up amplifier 27 are compared in error amplifier 31, which permits monitoring of the amplified thrust level program signal from level signal amplifier 74 by the signal from the pick-up amplifier 27, and the resultant signal is transmitted to switch circuit 29.

In switch circuit 29 the resultant signals from error amplifier 30, rate signal amplifier 73 and error amplifier 31 are compared and form a final resultant signal. This final resultant signal from switch circuit 29 is fed to power amplifier 33 (II) which operates force motor 9 (I).

This circuitry will now be described in more detail with particular reference to FIGURE 3 of the drawing. As shown in the drawing, a pair of driven potentiometers 34 and 35 are powered by battery 37 (Section IV), and another potentiometer 36 is powered by battery 38 (Section VIII). These potentiometers form the program device illustrated in FIGURE 4. Potentiometers 34 and 35 are the rate of change of thrust elements which are indicated diagrammatically at 28 (Section IV), in FIGURE 2 whereas potentiometer 36 is the thrust level program element depicted generally at 32 (Section VII), in FIGURE 2. The rate of change of thrust potentiometers 34 and 35 act in such a manner that when the voltage through one increases, the voltage through the other decreases. As seen from the drawing, the amount of increase and decrease depends upon the design requirements of the system. As the voltage through potentiometer 34 increases, the change is noted in the signal amplifier circuit 39 (Section III in FIGURE 3, and Section III' in FIGURE 2) by an increase in collector current. This causes a voltage to be impressed on the base of the power amplifier 40 (Section II), whose collector current increases proportionally. The current from the power amplifier 40 then passes through force motor winding 41 (Section I), which is one winding of the hydraulic servo force motor 9. The inverse procedure follows for the mating half of the system consisting of potentiometer 35 (Section IV), signal amplifier circuit 42 (Section III in FIGURE 3, and Section III' in FIGURE 2), power amplifier 43 (Section II), and force motor winding 44 (Section I), which is another winding of the hydraulic servo force motor 9. This "push-pull" system thus operates the hydraulic servo force motor 9 through windings 41 and 44. Power amplifiers 40 and 43 are powered by battery 45 (Section II) and are biased as shown to provide a zero signal current through motor windings 41 and 44. Since the current is equal and opposite at the junction of power amplifiers 40 and 43, the net effect is zero differential current. In this way, constant stable power is provided to hold the hydraulic valve spindle 8 closed when no signal is applied.

When a large differential current is applied across the motor windings 41 and 44, the hydraulic valve spindle 8 permits a high rate of fluid flow into the cylinder 5 causing the fluid flow restrictor 2 to move rapidly to the position desired. When the differential current through the motor windings 41 and 44 is small, the resultant movement of the flow restrictor 2 is proportionately slower. Thus, with a linear mechanical system when the flow restrictor 2 is moving at a constant velocity, the thrust of the rocket engine 1 is changed at a given rate for a given differential current. This portion of the control system is the rate of change of thrust program and amplifier.

The dual function feed-back circuit as shown in Sections IX, X and XI is used to monitor the rate of change of thrust together with the error amplifier circuit in Section V. Power amplifier 46 (Section V) acts as a variable impedance serving to adjust the current through the program potentiometers 34 and 35 (Section IV). This adjustment occurs when the feed-back signal is compared to the program signal at the input of the error amplifier 47 (Section V). The program rate of change signal is developed by a resistor-capacitor circuit formed of resistor 48 and capacitor 49 (Section V). This capacitor is thus charged to the program voltage at the same rate as the change in thrust rate. The two are compared and the error is amplified and passed to the power amplifier 46. In this way, variations in thrust rate are programmed as desired, monitored and tracked.

Figure 4:
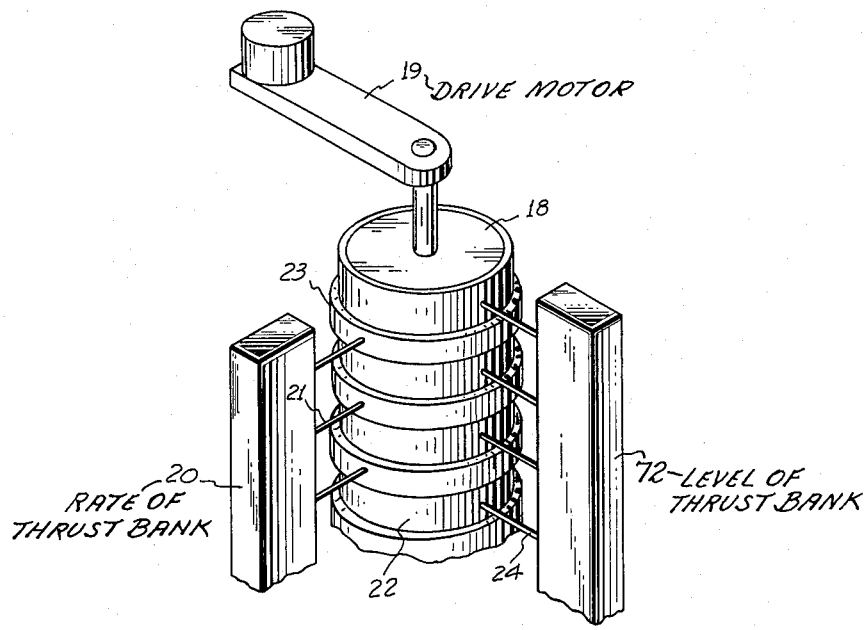
FIGURE 4 is a plan view illustrating an electrical program device of the present invention.
Figure 5:
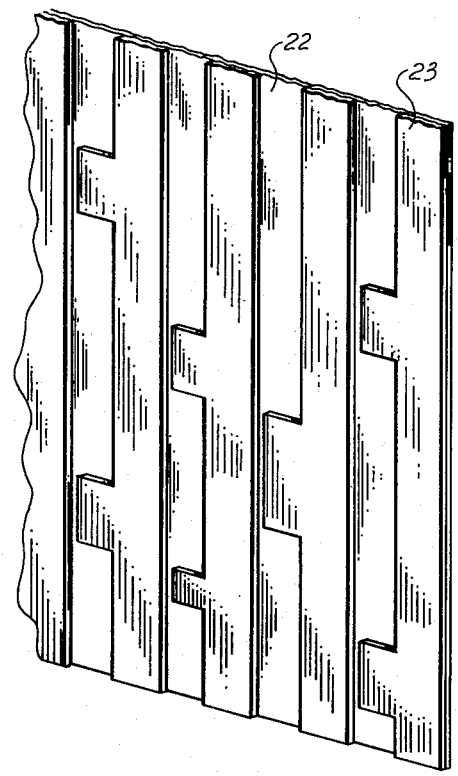
FIGURE 5 is a fragmentary plan view illustrating a portion of a programming device utilized in accordance with the present invention.

Once a thrust rate is thus established, a thrust level control is accomplished by adding a thrust level program as illustrated in Section VIII which is an integral part of the rate of thrust program tape and drum shown in FIGURE 4 of the drawing. Operating essentially in the same manner as the thrust rate program, this thrust level program (Section VIII) produces a reference signal that is amplified by amplifier 50 in Section VII and fed to the thrust level error amplifier 51 (Section VI). The second function of this feed-back circuit takes place as the feedback signal and the thrust level program signal are compared at the input and the error or the difference between them amplified by the error amplifier 51. The output from amplifier 51 is connected to a gate or switch circuit illustrated in Section III. This gate or switch circuit is provided with a pair of transistors 52 and 53 which control the collector voltage of the "push-pull" signal amplifier circuits 39 and 42. Resistors 54 and resistor 55 are in series with transistors 52 and 53, respectively, and their power supplying batteries 56 and 57 respectively. When transistors 52 and 53 are conducting, a voltage is developed across resistors 54 and 55 providing power for the signal amplifier circuits 39 and 42. When the thrust level program and feedback are equal, the gates are cut off and there is no flow of current due to the zero driving signal from the thrust level error amplifier 51. In this situation, the voltage across resistors 54 and 55 is zero and no power is provided for the signal amplifier circuits 39 and 42. The signal from the thrust rate program (Section IV) is thus effectively blocked and the rocket engine produces a constant thrust until the next level is programmed.

Figure 3:
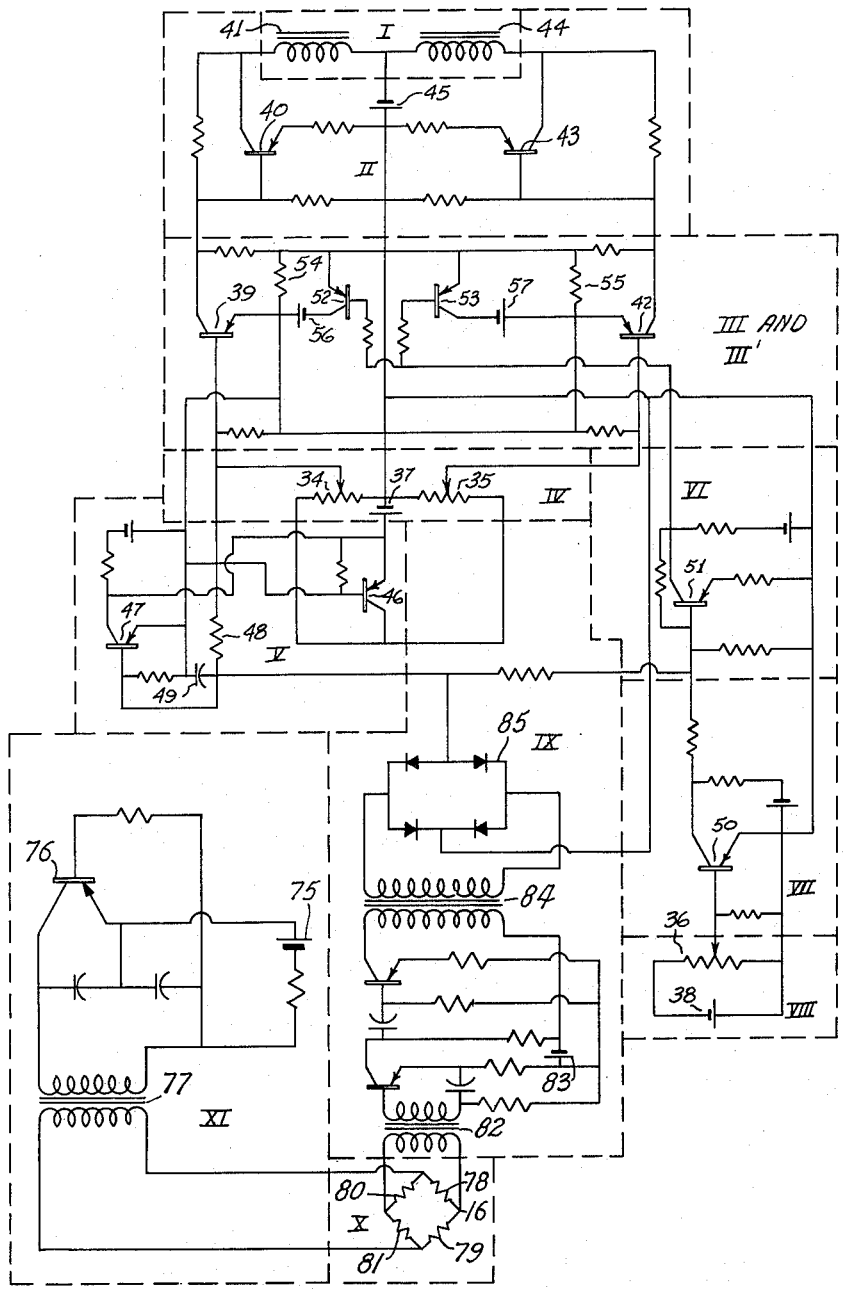
FIGURE 3 is a more detailed schematic diagram of the electrical control system employed in the present embodiment.

The dual function feed-back circuit shown in FIGURE 3 as Sections IX, X and XI, may be a conventional pick-up amplifier, pick-up device such as a thrust gauge or pressure transducer, and a pick-up power supply, respectively.

In FIGURE 3, Section XI shows the wiring diagram of a power source having a battery 75, interrupter 76, and transformer 77, which forms an alternating current to provide a pulsating signal to the pick-up device shown in Section X.

Section X shows a pressure transducer 16 having a transducer bridge comprised of four resistance wire strain sensitive gauges, 78, 79, 80 and 81, respectively, which are bonded to a heat treated metal ring which acts as an electric strain member. Two of the resistances 78 and 80 are strain gauges bonded to the internal surface of the ring and are thus in compression when the ring is flexed. The other two resistances 79 and 81 are strain gauges bonded to the external surface of the ring and are in tension. The bridge is unbalanced when a force is applied to the flexing ring by means of a small piston (not shown) which is acted upon through a diaphragm (not shown) which is responsive to the pressure in rocket engine 1.

The signal from the pick-up device in Section X is then transmitted to pick-up amplifier shown in Section IX, which is of the two stage amplifier type having a step-up transformer 82, a battery 83, a second step-up transformer 84 and a rectifier circuit 85. The signal from the rectifier circuit from the pick-up amplifier in Section X is then transmitted to the error amplifier in Section V and the error amplifier in Section VI, as discussed above.

A critical feature of the present invention is contained in the combined operation of the thrust level and rate of change of thrust programming and their respective feedback circuits. This arrangement, which has not heretofore been employed in rocketry, provides critical damping without sacrificing response.

While the in the above embodiment, a particular electrical circuitry has been described in some detail, it will be readily appreciated that the invention is not limited to this particular physical arrangement but that equivalent circuits can be employed with equal facility. It is only necessary that the rocket motor be provided with an electronic control system utilizing a predetermined programming device and a pressure transducer to monitor the engine reaction to the predetermined program.

Although the invention has been described with reference to particular embodiments and details, various modifications and adaptations will be apparent to one skilled in the art and the invention is therefore not to be limited to such embodiments and details except as set forth in the appended claims.

What is claimed is:

1. In a rocket engine, a combustion chamber containing a solid propellant charge, an exhaust nozzle for the chamber having a nozzle throat area adjustable in accordance with a programmed schedule, a first means providing a predetermined series of electrical signals to vary said nozzle throat area, a second means providing a predetermined series of electrical signals to control the rate of change in said nozzle throat area, a third means for providing electrical signals which are a measure of the pressure in said combustion chamber providing a feed-back correcting any deviations from the programmed schedule of changes in pressure resulting from variations in the nozzle throat area.

2. In a rocket engine, a combustion chamber containing a solid propellant charge, an exhaust nozzle for the chamber having a nozzle throat area adjustable in accordance with a programmed schedule, a first means providing a predetermined series of electrical signals to vary said nozzle throat area, a second means providing a predetermined series of electrical signals to control the rate of change in said nozzle throat area, a third means providing electrical signals which are a measure of the thrust of the rocket motor providing a feed-back correcting any deviations from the programmed schedule of changes in thrust resulting from variations in the nozzle throat area.

3. In a rocket engine, a combustion chamber containing a solid propellent and a nozzle orifice having a fixed nozzle throat area and an adjustable nozzle exit area, a first means providing a predetermined series of electrical signals to vary said nozzle exit area, a second means providing a predetermined series of electrical signals to control the rate of change in said nozzle exit area, a third means responsive to both said signals and operatively connected to vary the nozzle exit area at the signal rate of change, and a fourth means providing an electrical signal which is a measure of the pressure in said combustion chamber to regulate the degree of change in said nozzle exit area.

4. In a rocket engine, a combustion chamber containing a solid propellent and a nozzle orifice having a fixed nozzle throat area, an adjustable nozzle exit area, a restrictor positioned in said nozzle orifice to adjust the exit area, a first means for providing a predetermined series of electrical signals to vary said nozzle exit area, a second means to provide a predetermined series of electrical signals to control the rate of change in said nozzle exit area, a third means for providing electrical signals which is a measure of the pressure in said combustion chamber to regulate the degree of change in said nozzle exit area, and a fourth means responsive to all said signals and operatively connected to said restrictor for varying the nozzle exit area to a predetermined relation between the ratio of the nozzle exit area and the nozzle throat area and the ratio of the combustion chamber pressure and the pressure at the nozzle exit.

References Cited in the file of this patent

UNITED STATES PATENTS

| 2,734,340 | Wood | Feb. 14, 1956 |
| 2,780,914 | Ring | Feb. 12, 1957 |
| 2,805,542 | Boykin | Sept. 10, 1957 |
| 2,846,843 | Clark et al. | Aug. 12, 1958 |

FOREIGN PATENTS

| 1,088,638 | France | Sept. 15, 1954 |
| 750,476 | Great Britain | July 13, 1956 |
| 406,209 | Italy | Oct. 25, 1943 |

OTHER REFERENCES

Rocket Propulsion Elements by Sutton, 2nd edition, 1956, published by Wiley, pages 298–299.